(12) United States Patent
Niermann

(10) Patent No.: US 6,416,405 B1
(45) Date of Patent: Jul. 9, 2002

(54) COMBINE HAVING A FEEDING DEVICE FOR TRANSFERRING AND AN OUTLET ZONE FOR DISCHARGING STRAW, CHAFF AND LIKE MATERIALS

(75) Inventor: Martin Niermann, Harsewinkel (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 09/512,160

(22) Filed: Feb. 24, 2000

(30) Foreign Application Priority Data

Feb. 25, 1999 (DE) .......................... 199 08 111

(51) Int. Cl.⁷ .............................. A01F 12/44
(52) U.S. Cl. .................. 460/79; 460/111; 460/112; 241/186.3
(58) Field of Search .................. 460/39, 44, 78, 460/111, 112, 901, 71, 63, 66, 79; 241/243, 186.3; 56/503

(56) References Cited

U.S. PATENT DOCUMENTS

| | | | | | |
|---|---|---|---|---|---|
| 2,708,582 A | * | 5/1955 | Adams | ........................ | 239/650 |
| 3,539,113 A | * | 11/1970 | Tyler | ........................ | 239/673 |
| 3,670,739 A | * | 6/1972 | Rowland-Hill | ............... | 460/66 |
| 4,056,107 A | * | 11/1977 | Todd et al. | ................ | 460/112 |
| 4,292,795 A | * | 10/1981 | Linn | ........................ | 56/503 |
| 4,591,102 A | * | 5/1986 | Clarke | ........................ | 239/655 |
| 4,669,489 A | * | 6/1987 | Schraeder et al. | ........... | 460/112 |
| 4,735,216 A | * | 4/1988 | Scott et al. | ................ | 460/112 |
| 4,836,456 A | * | 6/1989 | Van Der Lely | ............. | 239/682 |
| 4,917,652 A | * | 4/1990 | Glaubitz et al. | ............ | 460/111 |
| 5,021,030 A | * | 6/1991 | Halford et al. | ............. | 460/111 |
| 5,215,500 A | * | 6/1993 | Kirby | ........................ | 460/111 |
| 5,232,405 A | * | 8/1993 | Redekop et al. | ............ | 460/112 |
| 5,501,635 A | * | 3/1996 | Niermann | .................... | 460/112 |
| 5,556,042 A | | 9/1996 | Roberg | | |
| 5,797,793 A | * | 8/1998 | Matousek et al. | .......... | 460/111 |
| 5,833,533 A | * | 11/1998 | Roberg | ........................ | 460/112 |
| 5,976,011 A | * | 11/1999 | Hartman | ...................... | 460/111 |
| 6,113,491 A | * | 9/2000 | Holmén | ...................... | 460/111 |

FOREIGN PATENT DOCUMENTS

| | | | | |
|---|---|---|---|---|
| DE | 38 26 321 C2 | 2/1990 | ........... | A01C/15/00 |
| DE | 43 21 905 | 1/1995 | ........... | A01F/12/40 |

\* cited by examiner

Primary Examiner—Thomas B. Will
Assistant Examiner—Árpád Fábián Kovács
(74) Attorney, Agent, or Firm—Husch & Eppenberger, LLC; Robert E. Muir; Richard J. Musgrave

(57) ABSTRACT

In a combine incorporating blowers (9) for spreading the discharge mixture of chopped straw and chaff over a wide area, the kinetic energy obtained through the medium of a chopper or feed device located prior to the blowers is retained so as to save on drive power by making the material outlet opening (4') of the chopper (4) or the feed device lie in the same plane as the inlet opening (9') of the blower (9).

7 Claims, 4 Drawing Sheets

COMBINE HAVING A FEEDING DEVICE FOR TRANSFERRING AND AN OUTLET ZONE FOR DISCHARGING STRAW, CHAFF AND LIKE MATERIALS

BACKGROUND OF THE INVENTION

The invention relates generally to agricultural machines and, more particularly to a combine having a broadcast spreader. One or more blowers are located in the outlet zone of the machine for spreading a discharge of straw and/or chaff over a wide area, and in which a chopper and/or rotary feed device is located prior to the blowers.

A combine of this type is known from DE-PS 43 21 905. There, a combine mounted straw chopper for the accruing straw is located in the outlet zone of a combine. Two blowers for spreading the discharged chopped straw and chaff over a wide area are provided downstream of the material flow. In this arrangement, the blowers are disposed below the chopper and are loaded with the chopped material from above via a feed funnel. The kinetic energy inherent to the material as a result of its passage through the chopper is thereby lost. The chopped material has to undergo a change of direction after passing through the blowers and must then be re-accelerated.

It would be advantageous to utilize at least part of the lost kinetic energy.

SUMMARY OF THE INVENTION

It is an object of the present invention to overcome the problem discussed above.

Another object is to achieve an energy-saving discharge of the chopped material and a wide distribution thereof over the field.

This object is achieved by making the material outlet opening of the chopper or the feed device lie in the same plane as the inlet opening of the blower for the purposes of feeding the material thereto without subjecting it to a change of direction. In an arrangement of this sort, the chopped material does not have to be slowed down during the process of transferring it from the chopper to the wide-spreading discharge device. It can be conveyed onwardly at the same speed as that with which it leaves the outlet end of the chopper. It is also possible for the chopped material to be subjected to further acceleration over and beyond the discharge speed from the chopper. Spread widths can thereby be obtained that would not be achievable if the chopped material were to be slowed down for an interim period. In the case of very wide cutter mechanisms having a width of 9 meters for example, such braking of the material would lead to the chopped material being distributed unevenly thus making any subsequent work on the field more difficult. In addition, the arrangement of the invention reduces the danger of a chopper or blower becoming blocked since material can no longer build up at the spot where the chopped material would change direction in a conventional arrangement. The more uniform conveyance of the chopped material also exerts a positive influence on the quality of the end product even when there are variations in the quantities being worked.

Thus, the downwardly open construction of the distributing blower has the advantage that any surplus of material will by-pass the blower and fall to the ground without causing a blockage should too much material be passed from the chopper to the blower. The rising straight or stepped edges of the part-piece ensure that the chopped material is properly distributed in the transverse direction in a very simple manner. It is easily possible to adjust the spread width by altering the height of the part-piece or by rotating it.

In accordance with the present invention there is provided a combine having an outlet zone for discharge of straw, chaff and like materials; a blower located at the outlet zone for spreading the materials over a wide area; a feeding device located upstream of the flow of materials to the blower and having an outlet opening; the feeding device outlet opening lying in the same plane as an inlet opening of the blower for transferring the materials directly to the inlet opening of the blower without a change of direction.

These, and other features and advantages of the present invention will become apparent as the same becomes better understood from the following detailed description when taken in conjunction with the accompanying drawings.

BRIEF DESCRIPTION OF THE DRAWINGS

Reference is now made more particularly to the drawings which illustrate the best presently known mode of carrying out the invention and wherein similar reference characters indicate the same parts throughout the views.

FIG. 3 is a view taken along line III—III of FIG. 2 and showing the shape of the casing.

DETAILED DESCRIPTION

Figure 1:
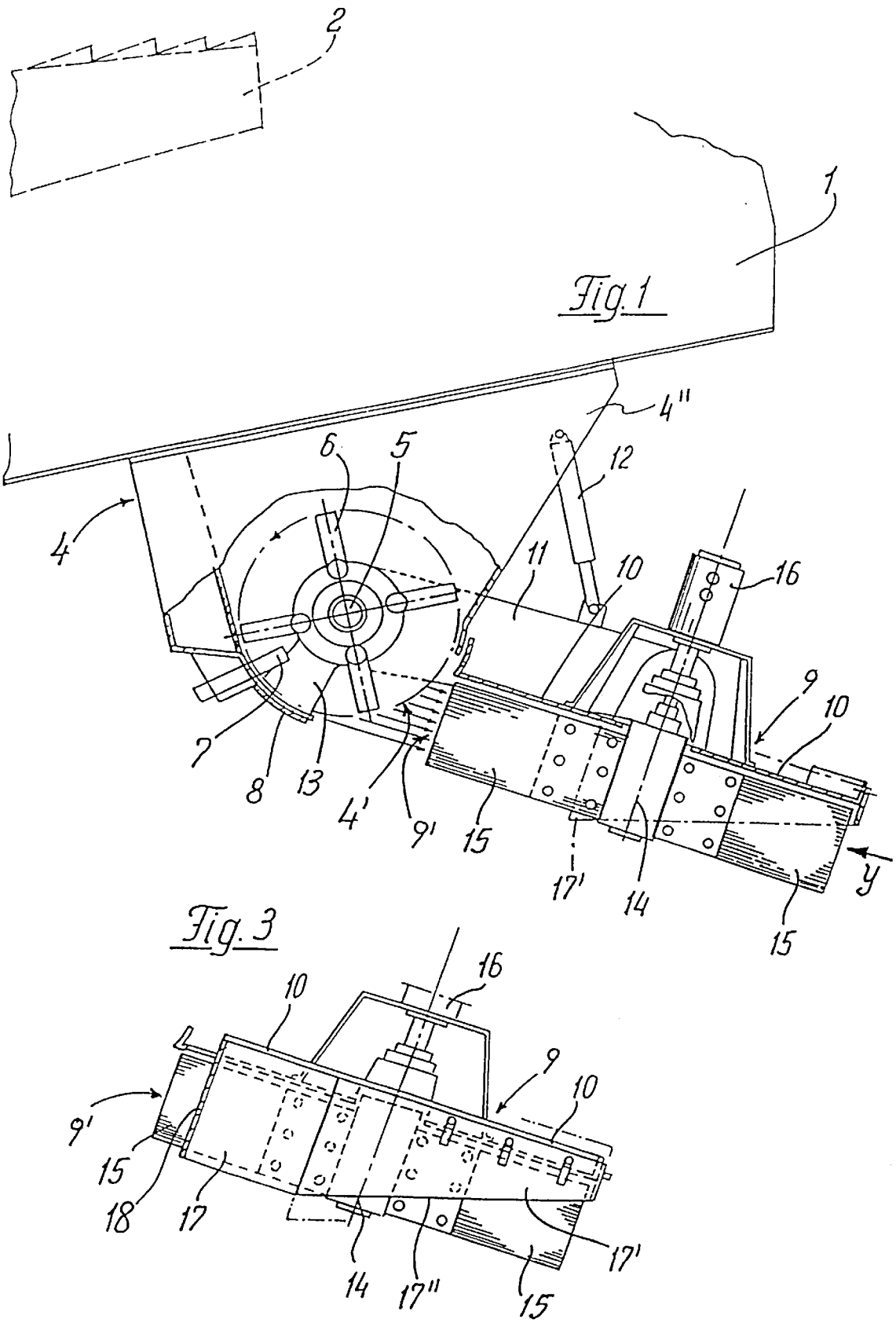
FIG. 1 is a view of one embodiment, partly in elevation and partly in a section along line I—I of FIG. 2.
Figure 2:
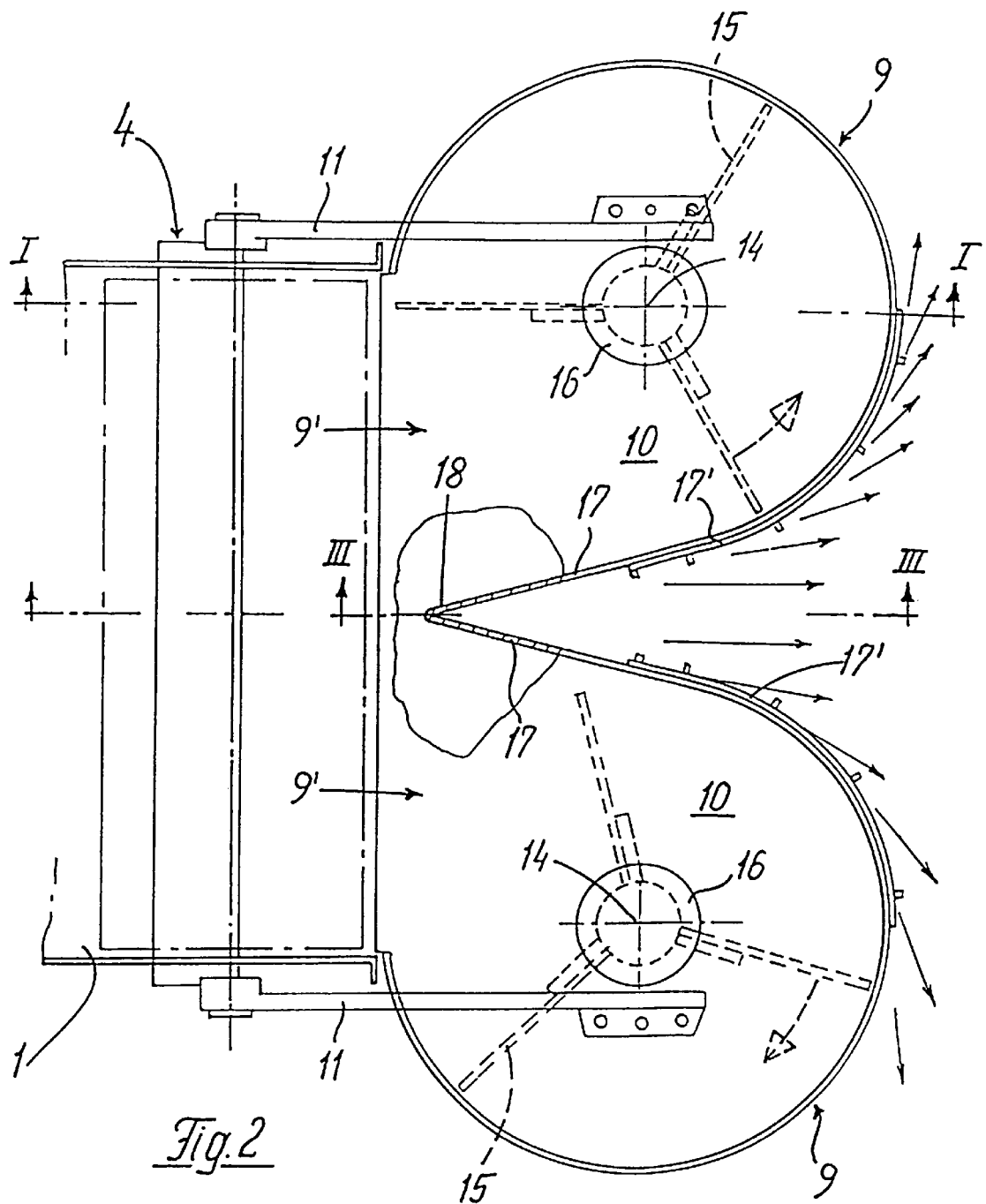
FIG. 2 is a schematic top view of a rear portion of a combine having a feed device and rotary blower.
Figure 4:
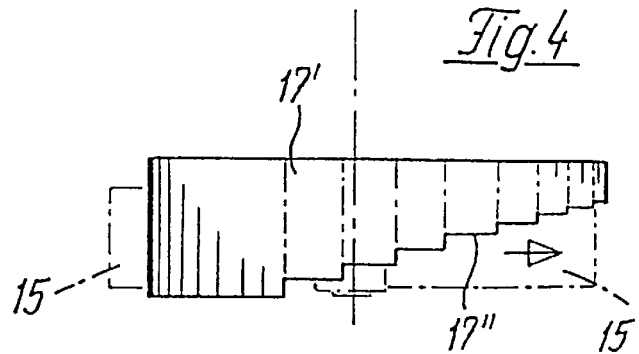
FIG. 4 is an alternative to the casing of FIG. 3.

The rear portion of a combine is referenced 1. As shown in FIG. 1, at the rear or discharge ends of straw walkers 2 ejecting the threshed mixture of straw, stalks, chaff or like material are ejected and fall downwardly by gravity. A combine mounted chopper 4 is disposed below the discharge ends of the straw walkers and has a rotational axis 5. The chopper 4 advantageously incorporates free-swinging knives 6 and counter blades 7.

Figure 6:
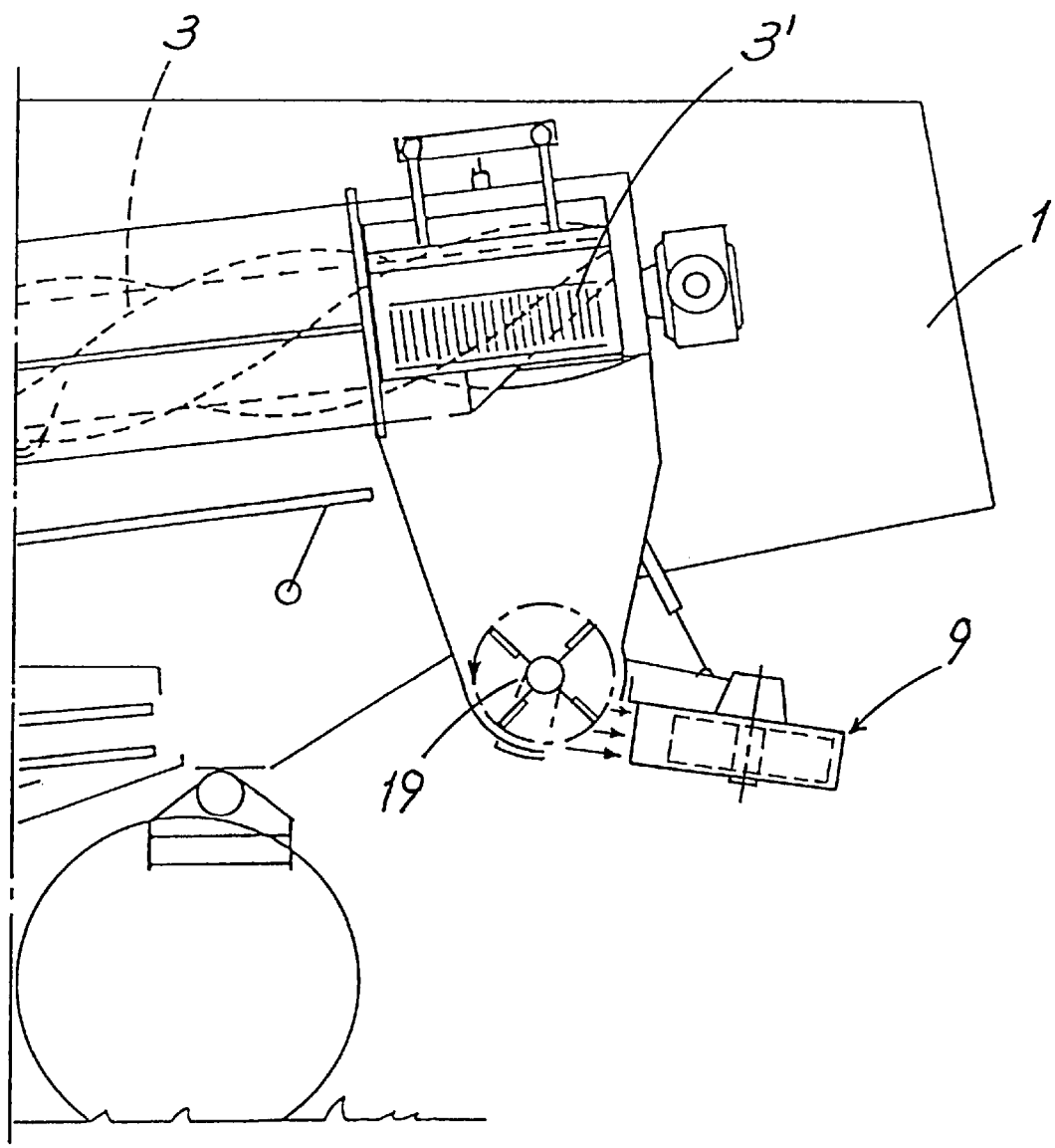
FIG. 6 is a view similar to FIG. 1 but illustrating another embodiment in which the chopper is integrated into a rotary separator and in which the chopped material is passed to the rotary blower by a feed conveyor.

As shown in the FIG. 6 embodiment, a rotary separating mechanism 3 advantageously has a co-axially attached chopper device 3'. In this embodiment, a feed device in the form of feed conveyor 19 rotatable about a generally horizontal axis, has a housing corresponding to that of the chopper 4 in FIG. 1, and is positioned in lieu of said chopper 4. In the following description it should be kept in mind that the device for feeding to the blower 9 may be either a chopper 4 or a feed conveyor 19.

A base portion 8 for guiding the flow of chopped material is associated with the chopper 4. This base portion bounds a material outlet opening 4' in the downward direction and the position thereof can be altered. Two axially parallel blowers 9 are slightly inclined to the ground and are arranged after the chopper 4. The bottoms of the housings of the blowers are preferably open and these housings are suspended via cover and mounting plates 10, supporting arms 11, and adjusting members 12. The adjusting members 12 are operative to selectively alter the position of the blowers 9. For this purpose the supporting arms 11 are pivotally mounted about the rotational axis 5 of the chopper 4 at their combine ends and are connected via connecting elements 13 to the base portion 8 of the chopper 4, as best seen in FIG. 1. The adjusting members 12 are conveniently attached to a chopper housing 4". When these members are actuated, the blowers 9 together with the base portion 8 are pivoted about the rotational axis 5 of the chopper 4 to alter the direction in which the chopped material is blown out. The tangential flow of material from the chopper 4 into inlet openings 9' of the blowers 9 remains unaltered as a result of this arrangement. The blowers 9 have rotational axes 14 on which are mounted impeller blades or paddles 15 which may be made of metal or a flexible material. The impeller paddles 14 are driven by appertaining drive elements 16.

Figure 5:
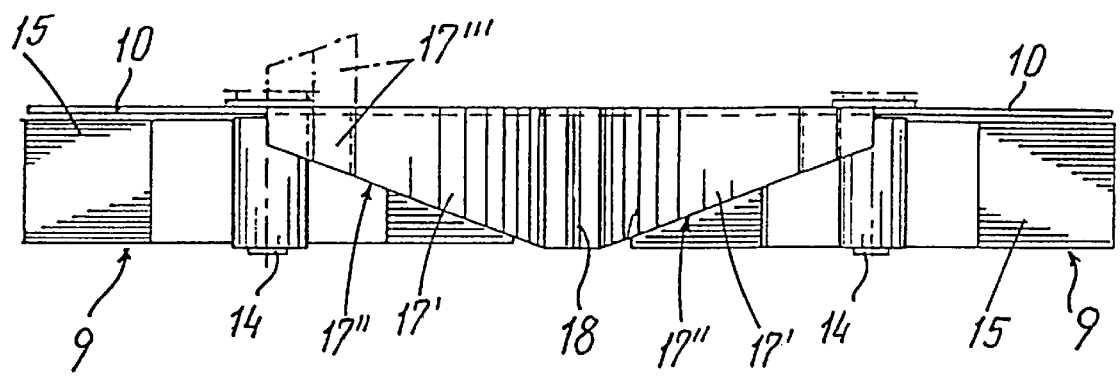
FIG. 5 is a fragmentary rear view taken generally in the direction of arrow "Y" in FIG. 1.

The housing comprises the two-part casing surfaces 17, 17' which are arranged—except in the material inlet zone—on the cover plates 10 of the blower such that they are directed towards the ground. These surfaces form a dividing peak 18 between the two blowers 9 in the vicinity of the inlet opening 9'. At the position of the dividing peak 18, the depth of the two casing surfaces 17 uniting at the dividing peak 18 corresponds to at least that of the material outlet opening 4'. The casing surfaces 17 extend outwardly from the dividing peak 18, following the rotational direction of the blower rotors and without any alteration in size, up to approximately the level of the rotational axes of the blowers. The adjoining casing surfaces surrounding the region around the blower rotors are formed by part-casing members 17' whose ground-facing edges extend upwardly in a straight line or in the form of steps up to the height of the cover plates 10. The sloping part-casing members 17' can also be adjusted in height as a complete unit so as to alter the angle of dispersion. They may also be rotated for this purpose. Foldable sections 17''' may be provided at the outer and lowermost ends of the sloping part-casing members 17' so as to allow these members to be shortened (FIG. 5).

In regard to the possible feed speeds, it should be noted that a chopper 4 ejects the crop at a feed speed of approximately 10 m/s. Whereas in a conventional process in which the chopped material is slowed down to 5 m/s as a result of its change of direction so that the distance to which it can be thrown is reduced accordingly, it is possible to achieve an ejection speed from the blower of 20 m/s in the case of a device in accordance with the embodiments when using a blower rotational speed of 400–600 RPM for example.

The invention is not restricted to the embodiment described and may be modified by the skilled person to meet requirements. The skilled person may also use other apparently suitable elements to replace the individual components described. While preferred embodiments of the invention have herein been illustrated and described, this has been done by way of illustration and not limitation, and the invention should not be limited except as required by the scope of the appended claims.

I claim:

1. A combine having an outlet zone for discharge of chopped materials; a rotary blower having an axis of rotation and being located at the outlet zone for spreading the materials over a wide area; a feeding device adjacent the blower; the feeding device being located upstream of the flow of materials to the blower and having an outlet opening; the feeding device outlet opening lying in the same plane as an inlet opening of the blower for transferring a flow of the materials directly to the inlet opening of the blower without a change of direction, and the flow of the transferred materials being generally perpendicular to an axis of rotation of the blower; means for changing the position of the blower; means for maintaining the same plane between the outlet opening of the feeding device and the inlet opening of the blower when the position of the blower changes, and wherein the blower has a supporting arm; and the means for maintaining the same plane between the outlet opening of the feeding device and the inlet opening of the blower includes a base portion that is pivotal about a rotational axis of the feeding device, and a connecting element for attaching said base portion to the supporting arm of the blower.

2. A combine having an outlet zone for discharge of chopped materials; a rotary blower having an axis of rotation and being located at the outlet zone for spreading the materials over a wide area; a feeding device adjacent the blower; the feeding device being located upstream of the flow of materials to the blower and having an outlet opening; the feeding device outlet opening lying in the same plane as an inlet opening of the blower for transferring a flow of the materials directly to the inlet opening of the blower without a change of direction, and the flow of the transferred materials being generally perpendicular to an axis of rotation of the blower, wherein the blower comprises a cover, a mounting plate, a first end and a second end; and including supporting arms for suspending the blower in an angularly pivotal manner at the rotational axis of the feeding device at the first end, and an adjusting member at the second end of the blower, said adjusting member being connected to fixed components of the machine.

3. A combine having an outlet zone for discharge of chopped materials; a rotary blower having an axis of rotation and being located at the outlet zone for spreading the materials over a wide area; a feeding device adjacent the blower; the feeding device being located upstream of the flow of materials to the blower and having an outlet opening; the feeding device outlet opening lying in the same plane as an inlet opening of the blower for transferring a flow of the materials directly to the inlet opening of the blower without a change of direction, the flow of the transferred materials being generally perpendicular to an axis of rotation of the blower; and a second blower, the blowers being pivotable about a rotational axis of the feeding device and equipped with a plurality of rotary impellers disposed behind the feeding device, the blowers each having a periphery bounded by partially surrounding casing surfaces which are attached to a cover and a mounting plate.

4. A combine in accordance with claim 3, wherein the casing surfaces are formed such that the two surfaces beginning in the vicinity of the inlet opening of the blower are united into a dividing peak in the inlet opening of the blower, and extend from the dividing peak at a uniform height.

5. A combine in accordance with claim 3, including a cover; and wherein the casing surfaces have edges with at least two edges adjoining each other, the adjoining edges of the casing surfaces being directed toward the ground and extending upwardly in a straight line in a direction of rotation of the rotary impellers up to a level of the cover.

6. A combine having an outlet zone for discharge of chopped materials; a rotary blower having an axis of rotation and being located at the outlet zone for spreading the materials over a wide area; a feeding device adjacent the blower; the feeding device being located upstream of the flow of materials to the blower and having an outlet opening; the feeding device outlet opening lying in the same plane as an inlet opening of the blower for transferring a flow of the materials directly to the inlet opening of the blower without a change of direction, a second blower, the blowers being equipped with a plurality of rotary impellers disposed behind the feeding device, the blowers each having a periphery bounded by partially surrounding casing surfaces, and wherein the casing surfaces decrease in height, and are attached to a cover and a mounting plate of the blower.

7. A combine in accordance with claim 6, wherein the casing surfaces comprise upwardly foldable sections.

* * * * *